(12) United States Patent
Ain-Kedem et al.

(10) Patent No.: US 11,513,204 B2
(45) Date of Patent: Nov. 29, 2022

(54) METHODS AND APPARATUS TO COMBINE FRAMES OF OVERLAPPING SCANNING SYSTEMS

(71) Applicant: Intel Corporation, Santa Clara, CA (US)

(72) Inventors: Liron Ain-Kedem, Kiryat Tivon (IL); Oren Shalita, Tel-Aviv (IL); Alon Cohen, Petach Tikva (IL); Yan Kaganovsky, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 602 days.

(21) Appl. No.: 16/586,431

(22) Filed: Sep. 27, 2019

(65) Prior Publication Data

US 2020/0025898 A1    Jan. 23, 2020

(51) Int. Cl.
| | |
|---|---|
| *G01S 17/88* | (2006.01) |
| *G01S 7/52* | (2006.01) |
| *G01S 17/89* | (2020.01) |
| *G01S 17/58* | (2006.01) |
| *G01S 7/481* | (2006.01) |

(52) U.S. Cl.
CPC ........ *G01S 7/52066* (2013.01); *G01S 7/4815* (2013.01); *G01S 7/52065* (2013.01); *G01S 17/58* (2013.01); *G01S 17/89* (2013.01)

(58) Field of Classification Search
CPC .............. G01S 7/4815; G01S 7/52065; G01S 7/52066; G01S 17/58; G01S 17/89
See application file for complete search history.

(56) References Cited

U.S. PATENT DOCUMENTS

2021/0208258 A1\*   7/2021   Kim ...................... G01S 17/42

\* cited by examiner

*Primary Examiner* — Kevin K Pyo
(74) *Attorney, Agent, or Firm* — Hanley, Flight & Zimmerman, LLC

(57) ABSTRACT

Methods, apparatus, systems and articles of manufacture to combine frames of overlapping scanning systems are disclosed. An example apparatus includes a time delay controller to determine a first time value and a second time value, the first time value different from the second time value; a capture synchronizer to, in response to the first time value corresponding to a first time, capture a first frame from a first scanning system and, in response to the second time value corresponding to a second time, capture a second frame from a second scanning system; and a capture combiner to combine the first frame and the second frame into a third frame, the third frame including data from the first frame and data from the second frame.

23 Claims, 11 Drawing Sheets

METHODS AND APPARATUS TO COMBINE FRAMES OF OVERLAPPING SCANNING SYSTEMS

FIELD OF THE DISCLOSURE

This disclosure relates generally to scanning systems, and, more particularly, methods and apparatus to combine frames of overlapping scanning systems.

BACKGROUND

Scanning technologies such as Light Detection and Ranging (LIDAR) and Radio Detection and Ranging (RADAR) enable the measurement of the range, angle, and/or velocity of objects. Scanning systems may cast electromagnetic waves (e.g., radio waves, ultraviolet waves) into an environment and measure the time over which a wave reflects off an object and returns. Such scanning enables other systems such as autonomous vehicles to determine the presence and characteristics of nearby objects in real time. Multiple scanning technologies may be combined to detect nearby objects in a large field of view.

Figure 1:
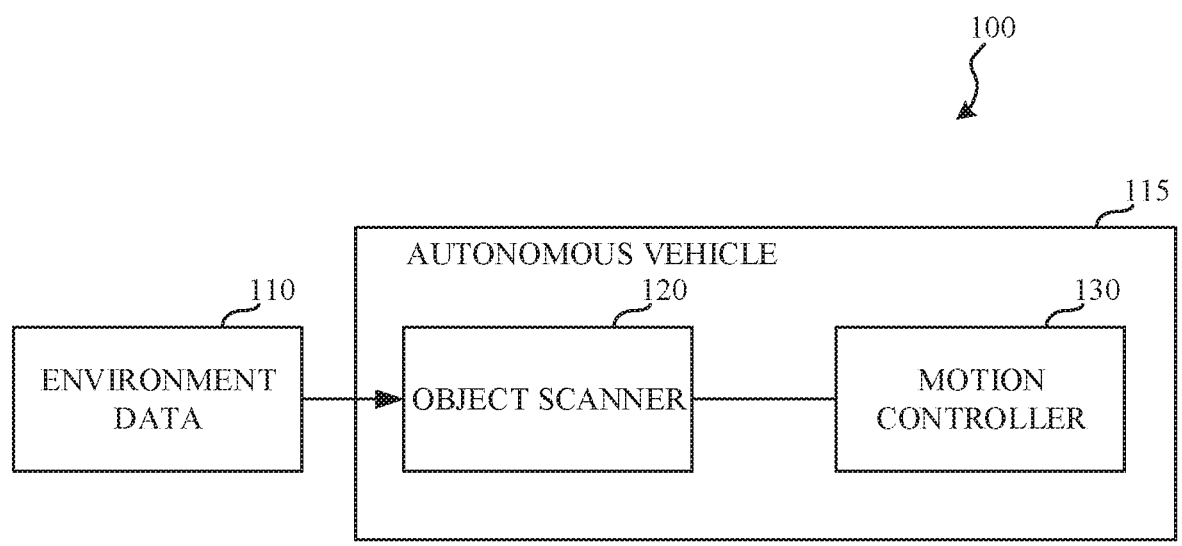
FIG. 1 depicts an example environment of use including an example system to overlap scanning systems.

The figures are not to scale. In general, the same reference numbers will be used throughout the drawing(s) and accompanying written description to refer to the same or like parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

FIG. 1 depicts an example environment 100 of use including an example system to overlap scanning systems. The example environment 100 of FIG. 1 includes environment data 110 and an autonomous vehicle 115. The autonomous vehicle 115 includes an example object scanner 120 and an example motion controller 130. The object scanner 120 collects the environment data 110. In examples disclosed herein, the environment data 110 includes external objects (e.g., pedestrians, vehicles, etc.) in the environment. However, any other data or objects may additionally or alternatively be included in the environment data 110. In some examples, the object scanner 120 includes scanning systems (e.g., LIDAR, RADAR) that propagate signals to be reflected by objects in the environment data 110.

The object scanner 120 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), graphics processing units (GPUs), etc. The object scanner 120 detects and indicates whether objects in the environment 100 are nearby the example autonomous vehicle 115. In examples disclosed herein, the object scanner 120 indicates whether an object in the environment 100 is nearby via a Boolean flag value. However, any other methods of indicating may additionally or alternatively be used.

The motion controller 130 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The motion controller 130 controls the direction and speed of the autonomous vehicle 115. If the nearby object scanner 120 indicates that an object in the environment 100 is nearby the autonomous vehicle 115, the motion controller 130 directs the autonomous vehicle 115 away from the object.

Figure 2:
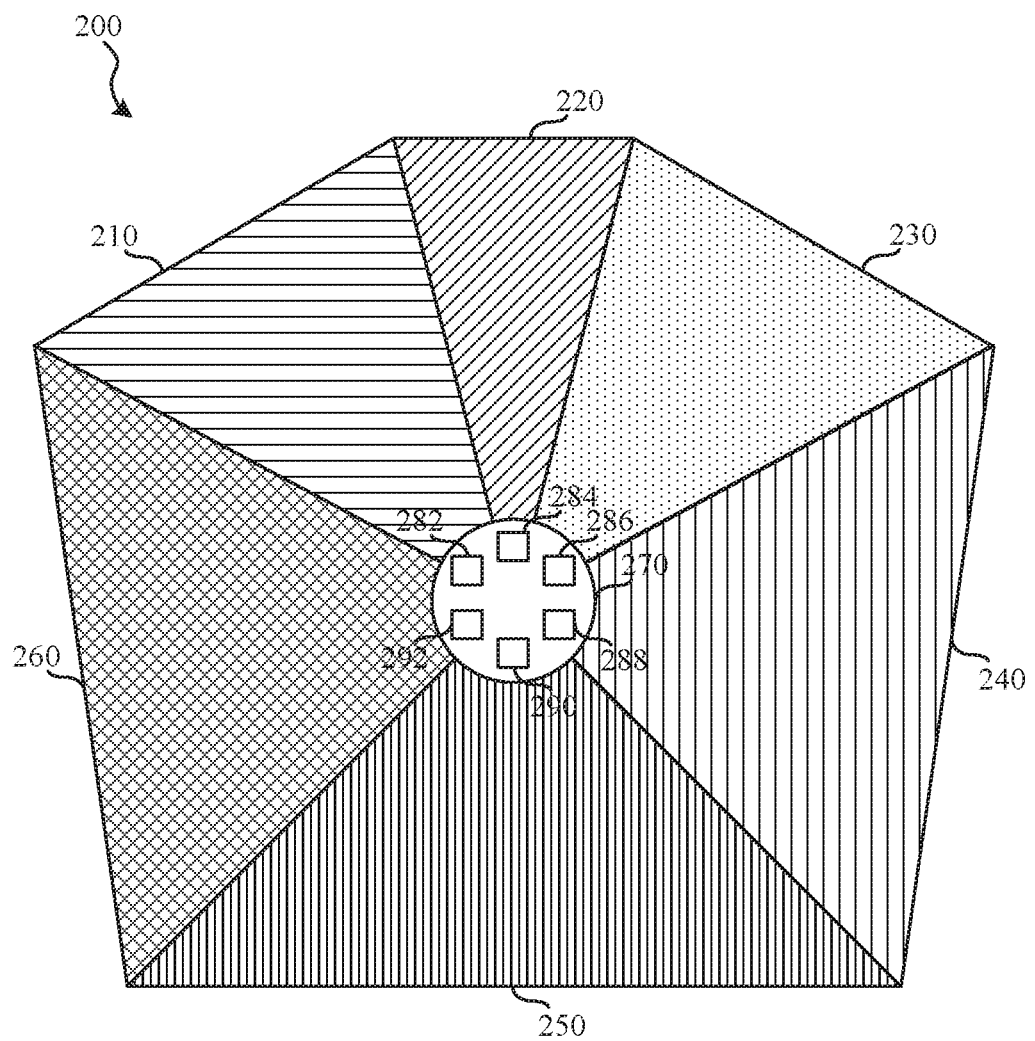
FIG. 2 is a diagram illustrating an example set of non-overlapping scanning systems to detect nearby objects in a 360-degree field of view in an example environment of use.

FIG. 2 is a diagram illustrating an example set of non-overlapping scanning systems 282, 284, 286, 288, 290, 292 to detect nearby objects in a 360-degree field of view in an example environment 200 of use. The environment 200 includes an example scanning object 270 and example scanning areas 210, 220, 230, 240, 250, 260. In the example illustrated in FIG. 2, the scanning object 270 includes the scanning systems 282, 284, 286, 288, 290, 292, each of which corresponds to a respective one of the scanning areas 210, 220, 230, 240, 250, 260. For example, a first scanning system 282 can capture frames of the environment 200 that include data within a first scanning area 210, a second scanning system 284 can capture frames of the environment 200 within a second scanning area 220, etc. As used herein, the phrases "frame" and "captured frame," including variations thereof, encompass data captured by at least one scanning system during a period of time. Frames may be captured at different periods of time, frames may be captured by multiple scanning systems, and multiple frames may be combined into a single frame. As used herein, the phrase "combination of frames," including variations thereof, encompasses a process to combine data included in separate frames into a single new frame.

Note that in the example illustrated in FIG. 2, a scanning area corresponds to a single scanning system. In the example illustrated in FIG. 2, six scanning systems 282, 284, 286, 288, 290, 292 are included in the scanning object 270. However, any number of scanning systems can be included with the scanning object 270. By monitoring each of the scanning areas 210, 220, 230, 240, 250, 260, the scanning object 270 has a 360-degree field of view of the example environment 200.

Figure 3:
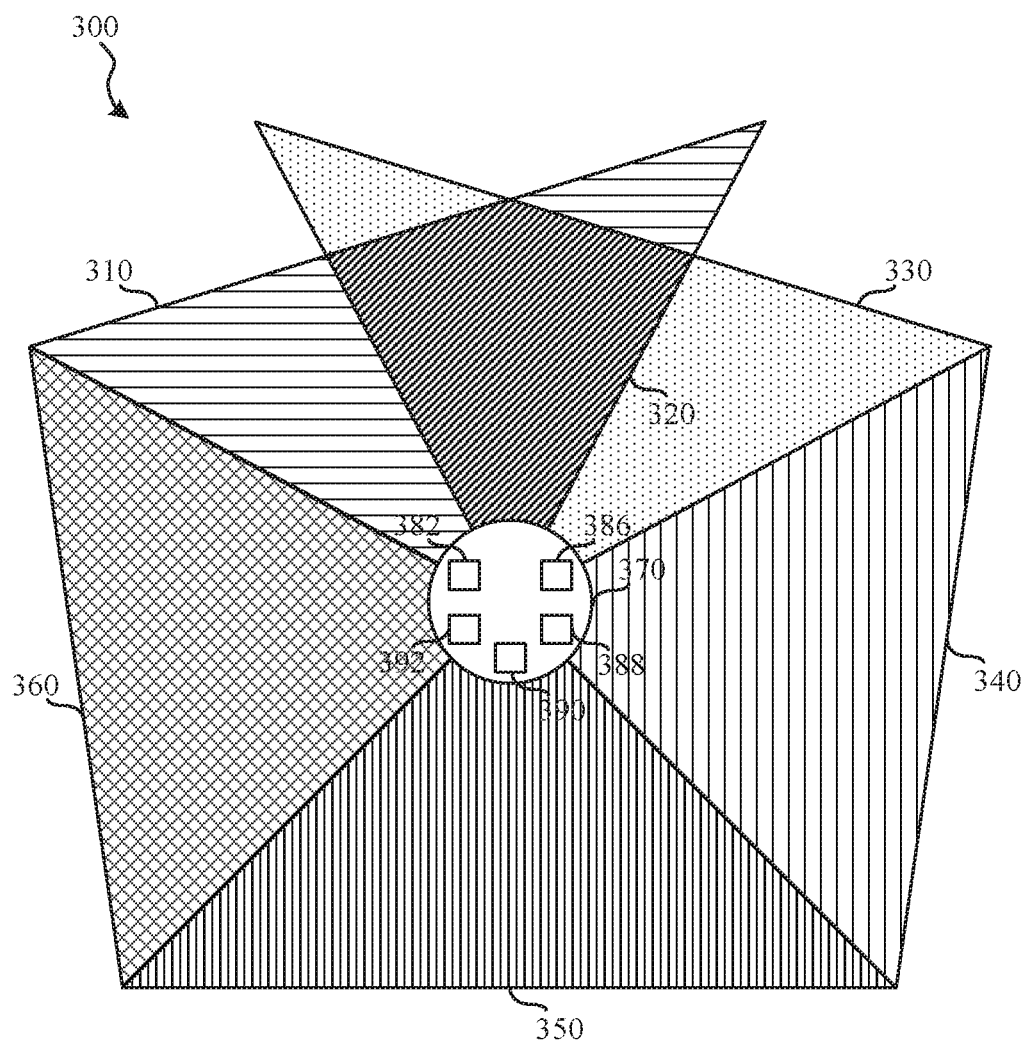
FIG. 3 is a diagram illustrating an example set of overlapping scanning systems to detect nearby objects in a 360-degree field of view in an example environment 300 of use.

FIG. 3 is a diagram illustrating an example set of overlapping scanning systems 382, 386, 388, 390, 392 to detect nearby objects in a 360-degree field of view in an example environment 300 of use. The environment 300 includes an example scanning object 370 and example scanning areas 310, 320, 330, 340, 350, 360. In the example illustrated in FIG. 3, the scanning object 370 includes the scanning systems 382, 386, 388, 390, 392. Not all of the scanning areas in the environment 300 correspond to a single scanning system. In other words, two or more scanning areas associated with different scanning systems overlap. For example, a first scanning area 320 corresponds to a combination of a second scanning area 310 associated with a first scanning system 382 and a third scanning area 330 associated with a second scanning system 386. Therefore, the first scanning area 320 corresponds to the first scanning system 382 and the second scanning system 386 (i.e., the first scanning area 320 is the overlap of the second scanning area 310 and the third scanning area 330).

Some of the scanning areas in the environment 300 correspond to a single scanning system. For example, a fourth scanning area 360 is associated with a third scanning system 392. In the illustrated example of FIG. 3, the scanning object 370 has a 360-degree field of view in the environment 300 using the scanning areas 310, 320, 330, 340, 350, 360, and the scanning area 320 associated with the two scanning systems 382, 386 represents a combination of frames captured by the two associated scanning systems 382, 386.

Figure 4:
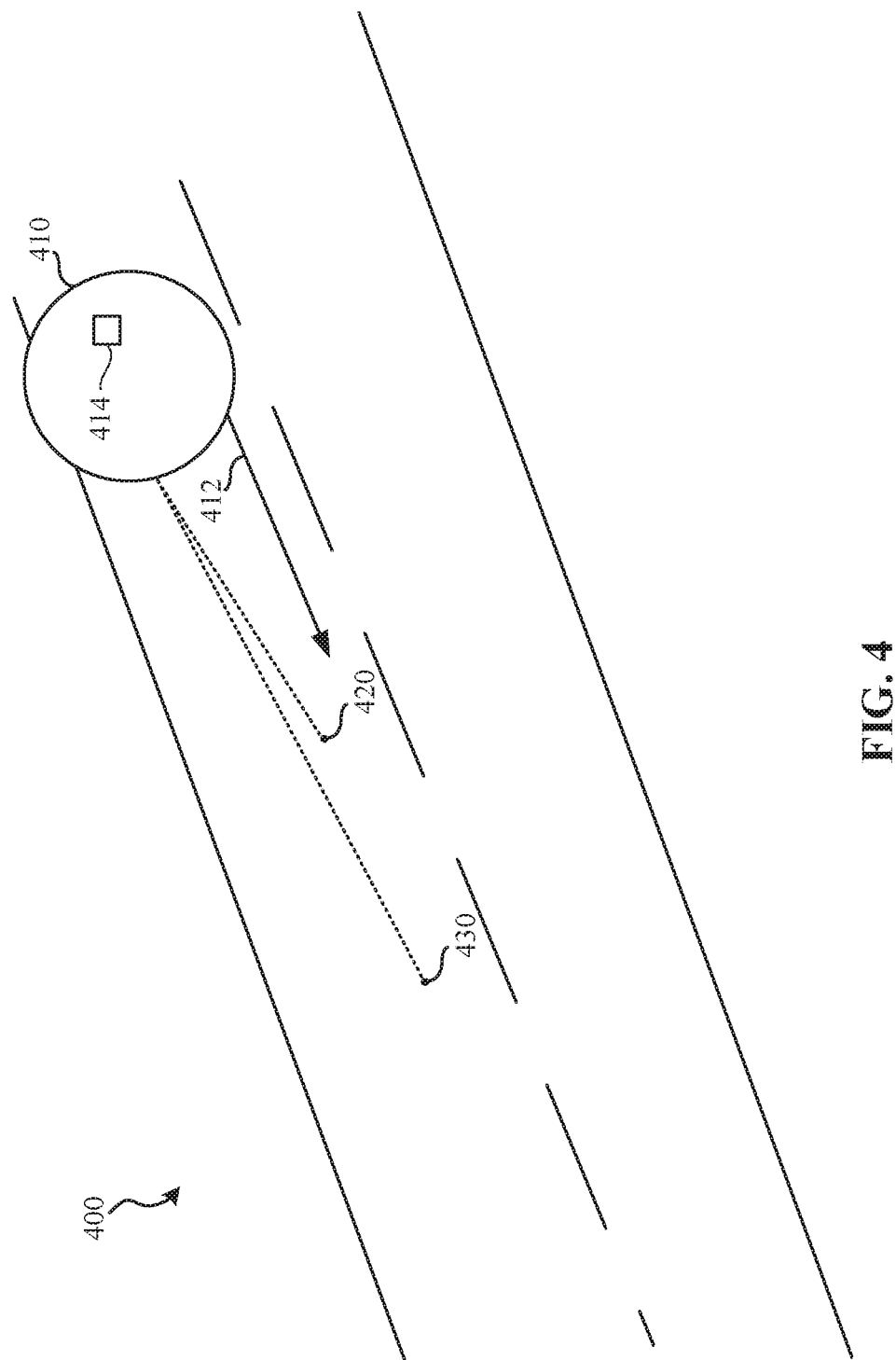
FIG. 4 is a diagram illustrating an example scanning object with an example scanning system to detect nearby objects in an environment of use.

FIG. 4 is a diagram illustrating an example scanning object 410 with an example scanning system 414 to detect nearby objects in an environment 400 of use. The example environment 400 includes the scanning object 410 moving at a velocity 412. The scanning object 410 includes the scanning system 414, a first example capture point 420, and a second example capture point 430. The scanning system 414 navigates through the environment 400 of use at the predetermined velocity 412. In examples disclosed herein, the scanning object 410 navigates through the environment 400 at a constant velocity. However, the scanning object 410 may navigate the environment 400 in any direction at any speed.

The scanning object 410 navigates to the first capture point 420, and the scanning system 414 captures a first frame of the environment 400. After a period of time, the scanning object 410 navigates to the second capture point 430, and the scanning system 414 captures a second frame of the environment 400. In the example illustrated in FIG. 4, the period of time corresponds to the time delay of the scanning system 414 between capturing the first frame and the second frame. Because the delay is the minimum time allowed by the scanning system 414 to capture a frame, there are no opportunities to gather additional data of the environment 400 at locations in between the first capture point 420 and the second capture point 430.

Figure 5:
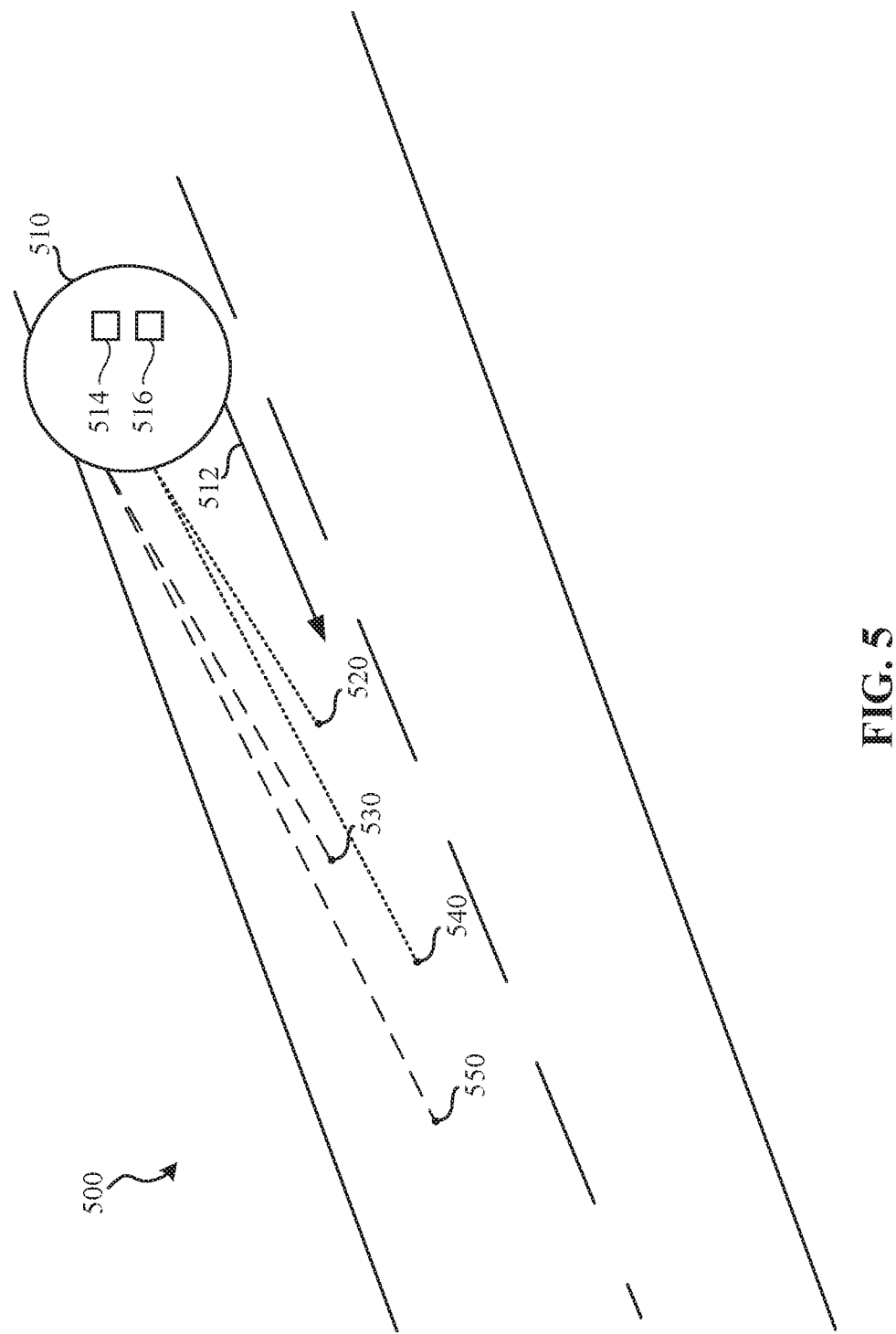
FIG. 5 is a diagram illustrating an example scanning object with multiple example scanning systems to detect nearby objects in an environment of use.

FIG. 5 is a diagram illustrating an example scanning object 510 with multiple example scanning systems 514, 516 to detect nearby objects in an example environment 500 of use. The environment 500 includes the scanning object 510 moving at a velocity 512. The scanning object 510 includes a first example scanning system 514, and a second example scanning system 516. The scanning object 510 also includes a first capture point 520, a second capture point 530, a third capture point 540, and a fourth capture point 550. The first capture point 520 and the third capture point 540 are associated with the first scanning system 514. The second capture point 530 and the fourth capture point 550 are associated with the second scanning system 516.

The second scanning system 516 navigates through the environment 500 of use at a predetermined velocity 512. In examples disclosed herein, the scanning object 510 navigates through the environment 500 at a constant velocity. However, the scanning object 510 may navigate the environment 500 in any direction at any speed.

The scanning object 510 navigates to the first capture point 520, and the first scanning system 514 captures a first frame of the environment 500. After a first period of time, the scanning object 510 navigates to the second capture point 530, and the second scanning system 516 captures a second frame of the environment 500. After a second period of time, the scanning object 510 navigates to the third capture point 540, and the first scanning system 514 captures a third frame of the environment 500. After a third period of time, the scanning object 510 navigates to the fourth capture point 550 and the second scanning system 516 captures a fourth frame of the environment 500.

In the example illustrated in FIG. 5, a combination of the first and second periods of time corresponds to the time delay of either scanning system 514, 516 between capturing the first frame and the second frame. Because the delay is the minimum time allowed by the first scanning system 514 to capture a frame, there are no opportunities for the first scanning system 514 to capture additional frames between the first capture point 520 and the third capture point 540. However, the second scanning system 516 is able to capture additional frames between the first and third capture points (e.g., the second capture point 530).

Figure 6:
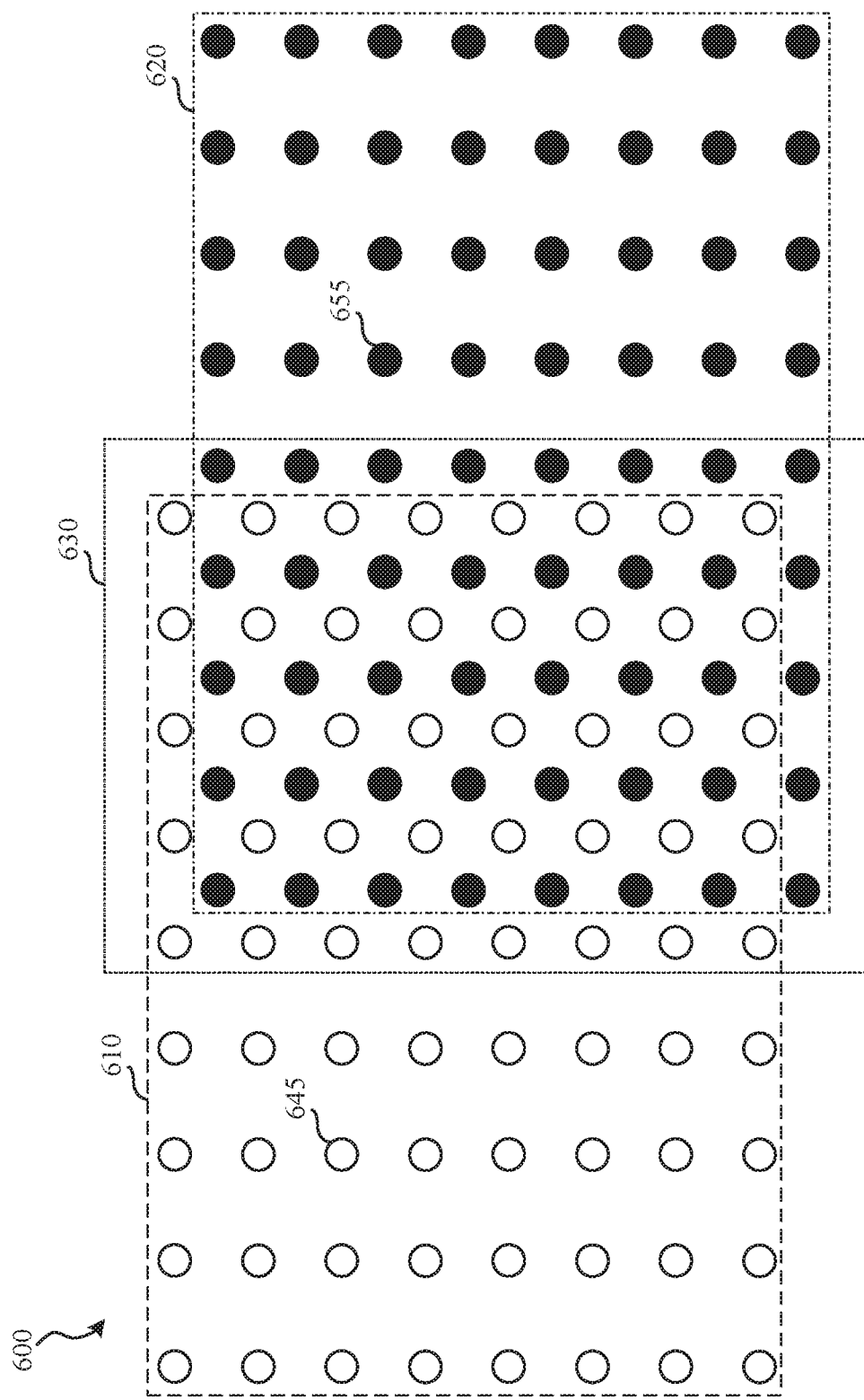
FIG. 6 is a diagram illustrating an overlap of frames captured from two example scanning systems in a collection of data points.

FIG. 6 is a diagram illustrating an overlap of frames captured from two example scanning systems in a collection of data points. The collection of data points 600 includes a first captured frame 610 and a second captured frame 620. The first captured frame 610 includes first captured data points 645, and the second captured frame 620 includes second captured data points 655. As used herein, the phrase "data points," or variations thereof, encompasses data captured in a frame. For example, a frame captured by a LIDAR scanning system may include data points in the frame, where each data point corresponds to a location in an environment as well as a signal response intensity or depth measurement. In another example, a frame captured by a RADAR scanning system may include data points in the frame where each data point corresponds to a power of a received signal at a certain velocity measurement.

In the illustrated example of FIG. 6, a subset of data points 630 in the captured frames 610, 620 overlap. In some examples, the overlapping subset of data points 630 represents an area in an environment that has been captured by a scanning system at two distinct times. In other examples, the overlapping subset of data points 630 represents an area in an environment that has been captured by two distinct scanning systems. Because the overlapping subset of data points 630 contains more data points than the data points from a single captured frame (e.g., the data points in the first captured frame 610 that are inside the overlapping area), the area represented by the subset of data points 630 can achieve a higher resolution, frame rate, and/or data point density than the first captured frame 610 or the second captured frame 620.

In some examples, processing the overlapping subset of data points 630 allows the object scanner 120 to detect more targets than can be detected by processing the frames 610, 620 individually. For example, multiple targets with similar velocities may be better detected by the overlapping subset of data points 630 from multiple RADAR scanning systems. In another example, the overlapping subset of data points 630 allows the object scanner 120 to detect a wider range of object velocities than those detected by processing the frames 610, 620 individually.

Figure 7:
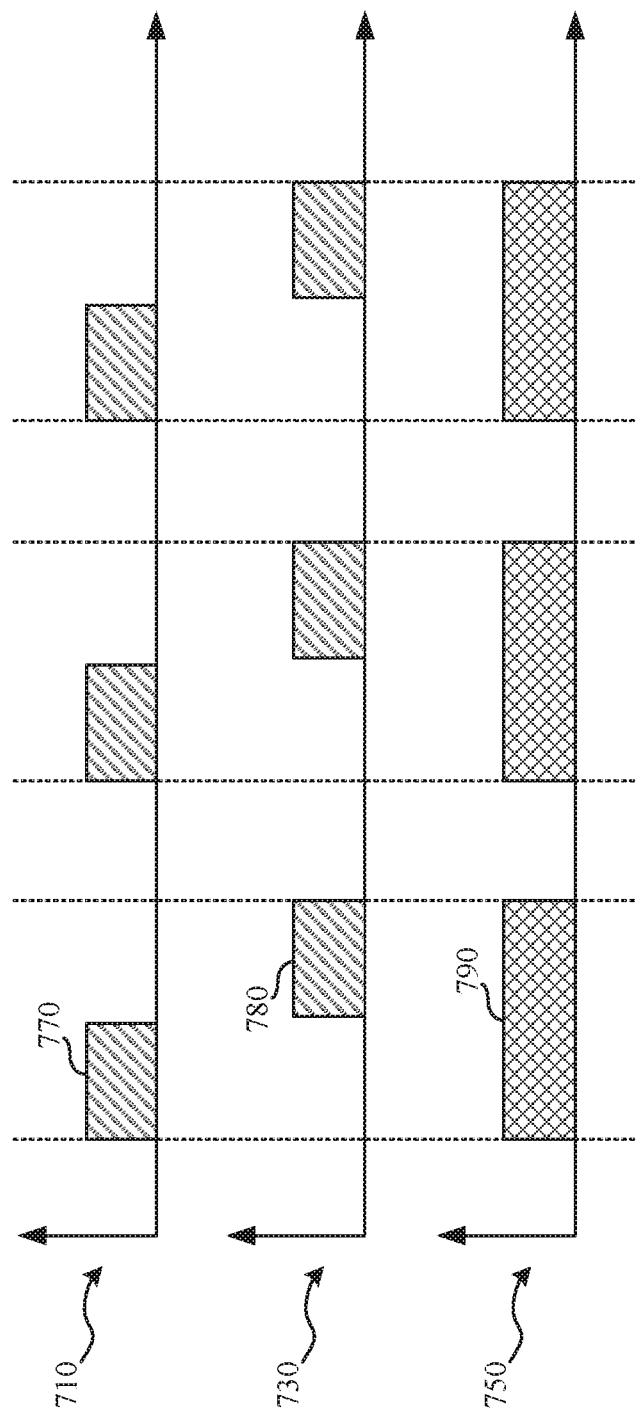
FIG. 7 is a diagram illustrating a combination of frames from two example scanning systems into a single frame.

FIG. 7 is a diagram illustrating a combination of frames from two example scanning systems into a single frame. FIG. 7 includes first data 710 captured over time by a first scanning system, second data captured 730 over time by a second scanning system, and a combination 750 of the first captured data 710 and the second captured data 730. In the example illustrated by FIG. 7, a first data frame 770 in the first captured data 710 and a second data frame 780 in the second captured data 730 are captured at two different time periods, and the time periods do not overlap. In some examples, each data frame represents a response to a propagation of a bank of chirps from a scanning system (e.g., a RADAR unit). The first data frame 770 and the second data frame 780 are combined into a new data frame 790, and the combined data frame 790 includes more information than either the first data frame 770 or the second data frame 780. For example, the combined data frame 790 may include a data point density or effective frame rate higher than that of the first data frame 770 or the second data frame 780. In another example, the combined data frame 790 may include a frame duration or maximum velocity measurement greater than that of the first data frame 770 or the second data frame 780. In the example illustrated in FIG. 7, the frame duration for the combined frame 790 twice as long as the frame duration for either the first data frame 770 or the second data frame 790.

Figure 8:
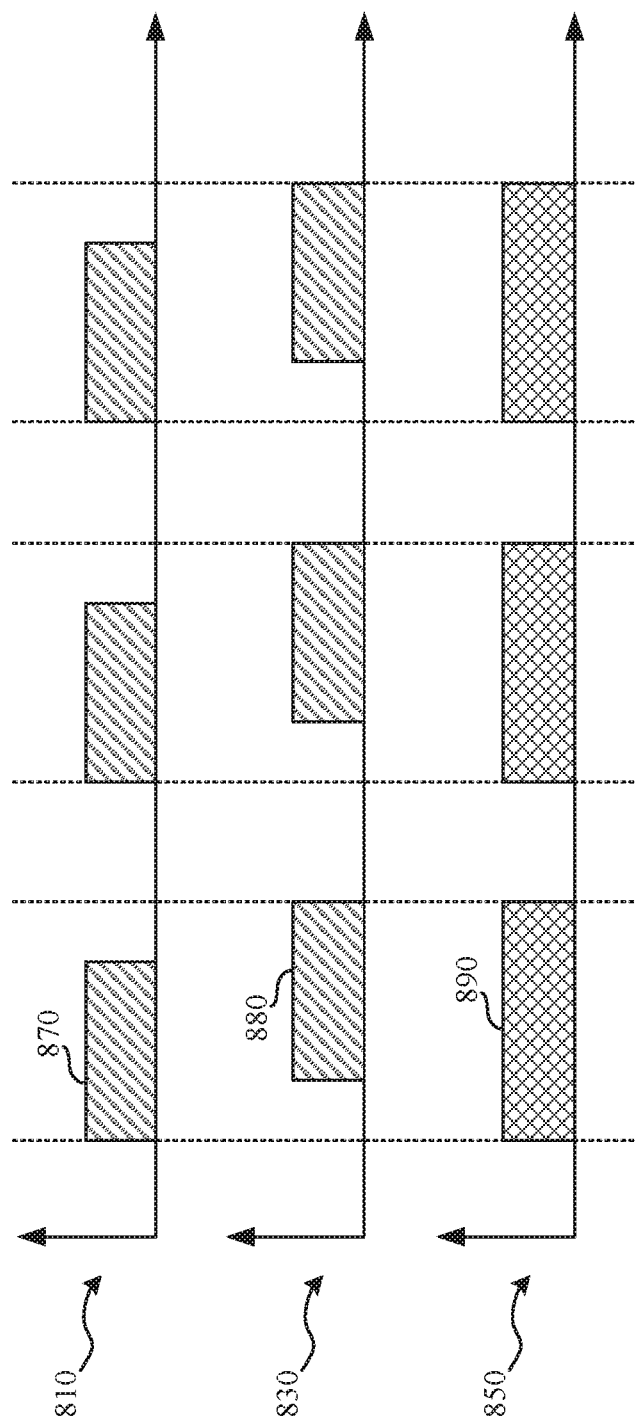
FIG. 8 is a diagram illustrating a combination of frames from two example scanning systems at overlapping time periods into a single frame.

FIG. 8 is a diagram illustrating a combination of frames from two example scanning systems at overlapping time periods into a single frame. FIG. 8 includes first data captured 810 by a first scanning system, second data captured 830 by a second scanning system, and a combination 850 of the first captured data 810 and the second captured data 830. In the example illustrated by FIG. 8, a first frame 870 in the first captured data 810 and a second frame 880 in the second captured data 830 are captured at two different time periods, and the time periods overlap. In some examples, each frame represents a response to a propagation of a bank of chirps from a scanning system (e.g., a RADAR unit). A combined frame 890 includes overlapping chirps from the first frame 870 and the second frame 880. As a result, the maximum value (e.g., Doppler measurement of a velocity of a vehicle) that can be measured using the combined frame 890 is double that of the maximum value that can be measured using either the first frame 870 or the second frame 880.

Figure 9:
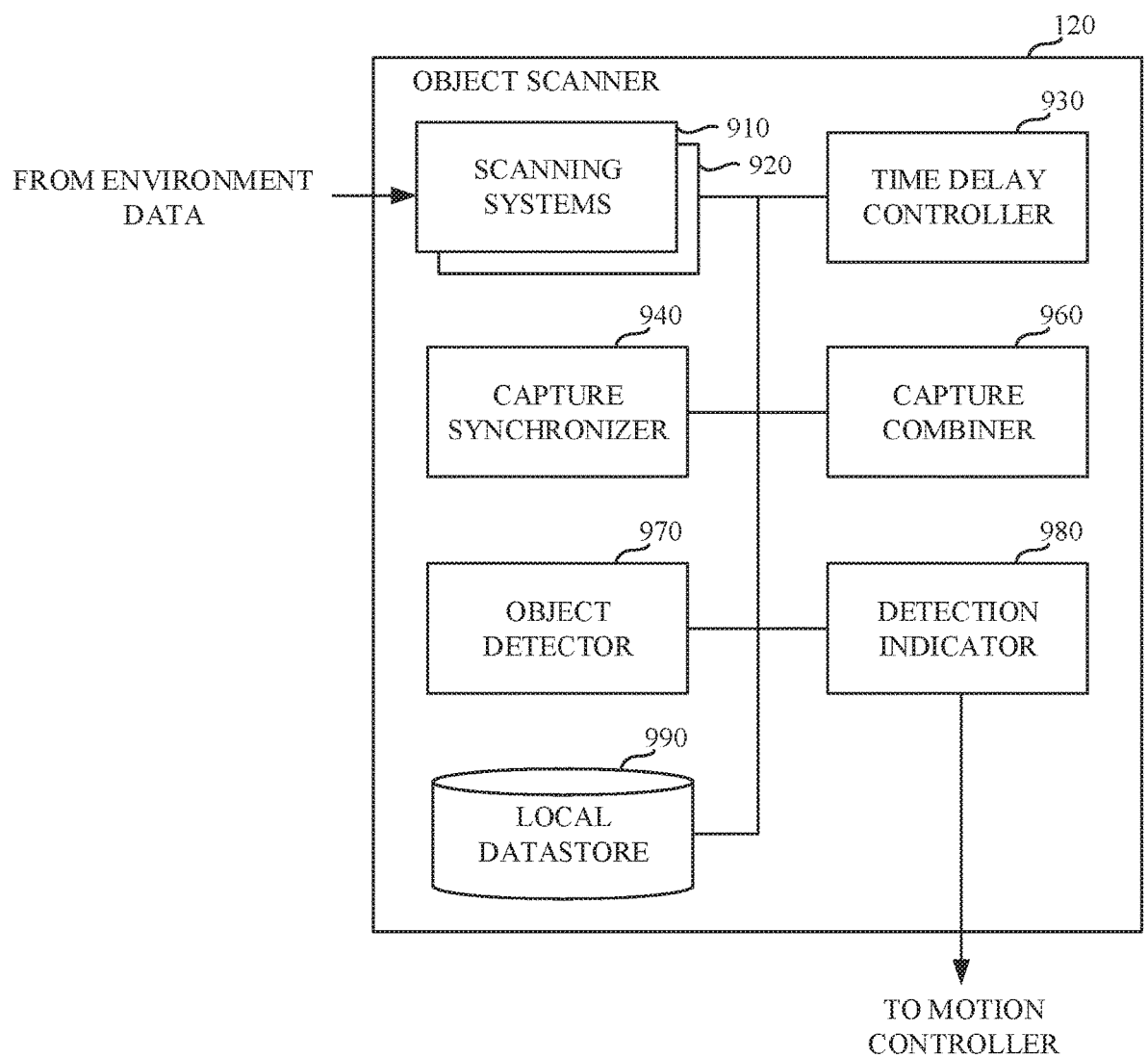
FIG. 9 is a block diagram of an example object scanner to combine overlapping scanning systems into a single frame to detect nearby objects in an environment.

FIG. 9 is a block diagram of the example object scanner 120 to combine overlapping scanning systems into a single frame to detect nearby objects in an environment. The object scanner 120 includes example scanning systems 910, 920, an example time delay controller 930, an example capture synchronizer 940, an example capture combiner 960, an example object detector 970, an example detection indicator 980, and an example local datastore 990.

The scanning systems 910, 920 of the illustrated example of FIG. 9 may be implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The scanning systems 910, 920 record the response to a propagation of a signal in an environment. In examples disclosed herein, the scanning systems 910, 920 are RADAR units. However, any other methods to scan an environment may additionally or alternatively be used, such as LIDAR.

The time delay controller 930 of the illustrated example of FIG. 9 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The time delay controller 930 waits for a period of time. In examples disclosed herein, the period of time is a predetermined amount of time. In some examples, the period of time may be scaled proportionally to a measurement of the velocity of the object scanner 120. In some examples, the time delay controller 930 may determine a first time value and a second value at which to capture frames. However, any of the capture synchronizer 940 or the scanning systems 910, 920 may determine the first time value and/or the second time value at which to capture a first frame and a second frame.

The capture synchronizer 940 of the illustrated example of FIG. 9 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The capture synchronizer 940 synchronizes the capturing of frames by the scanning systems 910, 920. In some examples, the capture synchronizer 940 may identify a first and a second time value at which to capture a first and second frame respectively. The capture synchronizer may capture a first frame when the first time value corresponds to the current time and capture the second frame when the second time value corresponds to the current time.

In examples disclosed herein, two scanning systems 910, 920 are included in the object scanner 120. However, any number of scanning systems may be included in the object scanner 120. In some examples, the capture synchronizer 940 may send a control signal (e.g., a system clock) to the scanning systems 910, 920 to prompt each scanning system 910, 920 to generate a frame. In other examples, a first scanning system 910 may be configured as a master, a second scanning system 920 may be configured as a slave, and the first scanning system 910 sends a control signal (e.g., a system clock) to prompt the second scanning system to generate a frame at the time of the capture of the first scanning system 910.

In further examples including scanning systems 910, 920 in a master/slave configuration, the first scanning system 910 may send a control signal to the second scanning system 920 based on the time required for the first scanning system 910 to generate a data point during a capture of a frame. For example, the first scanning system 910 may capture a first frame at a first time and command the second scanning system 920 to capture a second frame at a second time, where the difference between the first time and the second time is half of the time needed for the first scanning system to generate a data point. In some examples, the first scanning system 910 or the capture synchronizer 940 may calculate the delay to send the signal to the second scanning system may be half of the time required to generate a data point.

In some examples, the first scanning system 910 may send a control signal to the second scanning system 920 based on the time required for the first scanning system 910 to capture a frame. For example, the first scanning system 910 may capture a first frame at a first time and command the second scanning system 920 to capture a second frame at a second time, where the difference between the first time and the second time is half of the time needed for the first scanning system to generate a frame. In other words, for example, if the first scanning system 910 requires two milliseconds to capture a frame, the first scanning system 910 may send a control signal to the second scanning system 920 one millisecond after the first scanning system 910 has begun to capture a frame. In other examples not including a master/slave configuration, each of the scanning systems 910, 920 may determine a time at which to generate a frame using a shared system clock.

In further examples, the capture synchronizer 940 may include a clock shared between the scanning systems 910, 920. The shared clock may indicate to the scanning systems 910, 920 when to capture a frame. The scanning systems 910, 920 may include internal synchronization controllers that determine a time at which to capture a frame using the data provided by the shared clock.

The capture combiner 960 of the illustrated example of FIG. 9 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The capture combiner 960 combines multiple frames into a single frame. In examples disclosed herein, the first scanning system 910 and the second scanning system 920 each capture one frame to be combined. However, the capture combiner 960 may combine any number of frames from any number of scanning systems.

In some examples, the capture combiner 960 may combine frame captures using super-resolution imaging. For example, the capture combiner 960 may detect sub-data point shifts between the multiple captures to determine to combine the frames. In other examples, the capture combiner 960 trains and executes a machine learning model (e.g., a generative adversarial network, a deep learning neural network, residual network, etc.) to enhance the frames captured by the scanning systems 910, 920.

The object detector 970 of the illustrated example of FIG. 9 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The object detector 970 determines whether the combined frame includes a nearby object. In examples disclosed herein, the object detector 970 executes a machine learning model (e.g., a convolutional neural network) to determine whether the frame includes a nearby object. However, any other methods to determine whether the frame includes an object may additionally or alternatively be used.

The detection indicator 980 of the illustrated example of FIG. 9 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The detection indicator 980 indicates that a nearby object was detected. In examples disclosed herein, the detection indicator 980 indicates that a nearby object was detected using a Boolean flag value. However, any other methods to indicate that a nearby object was detected may additionally or alternatively be used.

The local datastore 990 of the illustrated example of FIG. 9 is implemented by any memory, storage device and/or storage disc for storing data such as, for example, flash memory, magnetic media, optical media, solid state memory, hard drive(s), thumb drive(s), etc. Furthermore, the data stored in the local datastore 990 may be in any data format such as, for example, binary data, comma delimited data, tab delimited data, structured query language (SQL) structures, etc. While, in the illustrated example, the local datastore 990 is illustrated as a single device, the local datastore 990 and/or any other data storage devices described herein may be implemented by any number and/or type(s) of memories. In the illustrated example of FIG. 9, the local datastore 990 stores frames captured by the scanning systems 910, 920 and frames combined by the capture combiner 960. In some examples, the local datastore 990 may store a trained machine learning model for the capture combiner 960 to execute during data frame processing.

Figure 10:
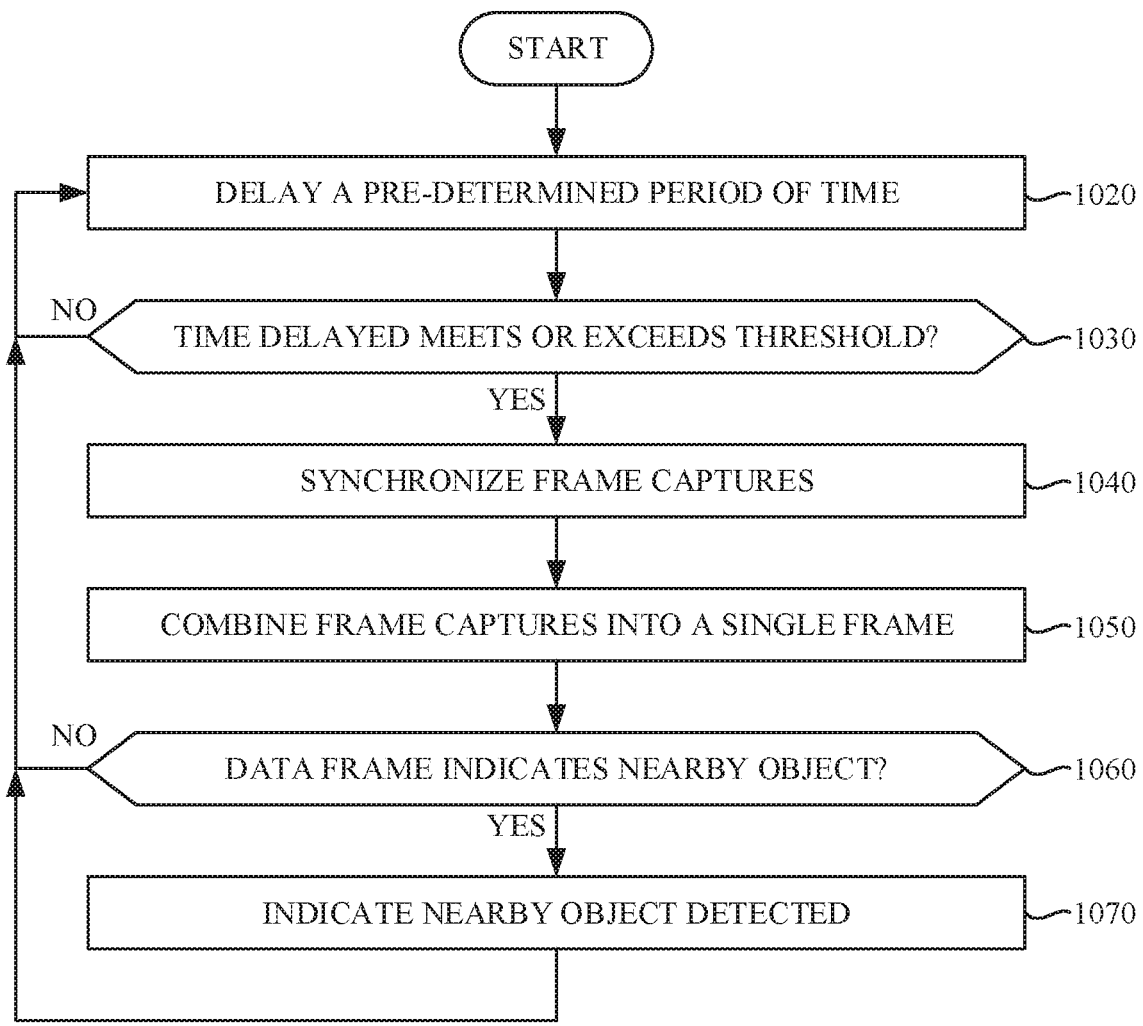
FIG. 10 is a flowchart representative of machine-readable instructions which may be executed to implement the example object scanner of FIG. 9.

While an example manner of implementing the example object scanner 120 of FIG. 9 is illustrated in FIG. 10, one or more of the elements, processes and/or devices illustrated in FIG. 9 may be combined, divided, re-arranged, omitted, eliminated and/or implemented in any other way. Further, the example scanning systems 910, 920, the example time delay controller 930, the example capture synchronizer 940, the example capture combiner 960, the example object detector 970, the example detection indicator 980, and/or, more generally, the example object scanner 120 of FIG. 9 may be implemented by hardware, software, firmware and/or any combination of hardware, software and/or firmware. Thus, for example, any of the example scanning systems 910, 920, the example time delay controller 930, the example capture synchronizer 940, the example capture combiner 960, the example object detector 970, the example detection indicator 980, and/or, more generally, the example object scanner 120 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example scanning systems 910, 920, the example time delay controller 930, the example capture synchronizer 940, the example capture combiner 960, the example object detector 970, and/or the example detection indicator 980 is/are hereby expressly defined to include a non-transitory computer readable storage device or storage disk such as a memory, a digital versatile disk (DVD), a compact disk (CD), a Blu-ray disk, etc. including the software and/or firmware. Further still, the example object scanner 120 of FIG. 9 may include one or more elements, processes and/or devices in addition to, or instead of, those illustrated in FIG. 10, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the example object scanner 120 of FIG. 9 is shown in FIG. 10. The machine-readable instructions may be one or more executable programs or portion(s) of an executable program for execution by a computer processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIG. 10, many other methods of implementing the example object scanner 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B.

Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 10 is a flowchart representative of machine-readable instructions which may be executed to implement the example object scanner 120 of FIGS. 1 and 9. The example time delay controller 930 waits for a period of time. (Block 1020). In examples disclosed herein, the period of time is a pre-determined amount of time. In some examples, the period of time may scale proportionally to a measurement of the velocity of the example object scanner 120. If the time delay controller 930 determines that the period of time delayed does not meet or exceed a delay threshold (e.g., block 1030 returns a result of NO), control returns to the time delay controller 930 at block 1020.

If the example time delay controller 930 determines that the period of time delayed meets or exceeds a delay threshold (e.g., block 1030 returns a result of YES), the capture synchronizer 940 synchronizes the capturing of frames by the scanning systems 910, 920. (Block 1040). As previously mentioned, in examples disclosed herein, two scanning systems 910, 920 are included in the object scanner 120. However, any number of scanning systems may be included in the object scanner 120.

Once the frames have been captured by the scanning systems 910, 920, the capture combiner 960 combines the multiple frame captures into a single frame. (Block 1050). In examples disclosed herein, the first scanning system 910 and the second scanning system 920 each capture one frame to be combined. However, the capture combiner 960 may combine any number of captures from any number of scanning systems.

In examples disclosed herein, the capture combiner 960 combines the raw captured frame from each scanning system 910, 920 into a combined frame for one frame time. (Block 1050). In some examples, the combined frame has a higher resolution (e.g., temporal, spatial, etc.) and/or frame rate than that of the raw captured frames. In some examples, the raw captured frames are combined using super-resolution processes such as a trained machine learning model. The super-resolution processes may be used to improve the temporal and/or spatial resolution of the combined frame. However, other methods to combine the frames may additionally or alternatively be used by the capture combiner 960. For example, either of the scanning systems 910, 920 may process the captured frame before combination by the capture combiner 960. Examples disclosed herein may allow additional scanning technologies (e.g., polygon scanning) to be used as a scanning system. Examples disclosed herein may improve performance of the object scanner 120 through the reduction of scanning systems 910, 920 needed to scan the environment 100.

In some examples, the capture combiner 960 may combine frame captures using super-resolution imaging. For example, the capture combiner 960 may detect sub-data point shifts between the multiple captures to determine to combine the frames. In other examples, the capture combiner 960 trains and executes a machine learning model (e.g., a generative adversarial network, a deep learning neural network, residual network, etc.) to enhance the frames captured by the scanning systems 910, 920.

After the data frames have been combined by the capture combiner 960, the object detector 970 determines whether the combined frame includes a nearby object. (Block 1060). In examples disclosed herein, the object detector 970 executes a machine learning model (e.g., a convolutional neural network) to determine whether the frame includes a nearby object. However, any other methods to determine whether the frame includes an object may additionally or alternatively be used.

If the object detector 970 determines that the combined frame includes a nearby object (e.g., block 1060 returns a result of YES), the detection indicator 980 indicates that a nearby object was detected. (Block 1070). In examples disclosed herein, the detection indicator 980 indicates that a nearby object was detected using a Boolean flag value. However, any other methods to indicate that a nearby object was detected may additionally or alternatively be used. Control then returns to the time delay controller 930 to delay for a period of time. (Block 1020). If the object detector 970 does not determine that the combined frame includes a nearby object (e.g., block 1060 returns a result of NO, control returns to the time delay controller 930 at block 1020.

Figure 11:
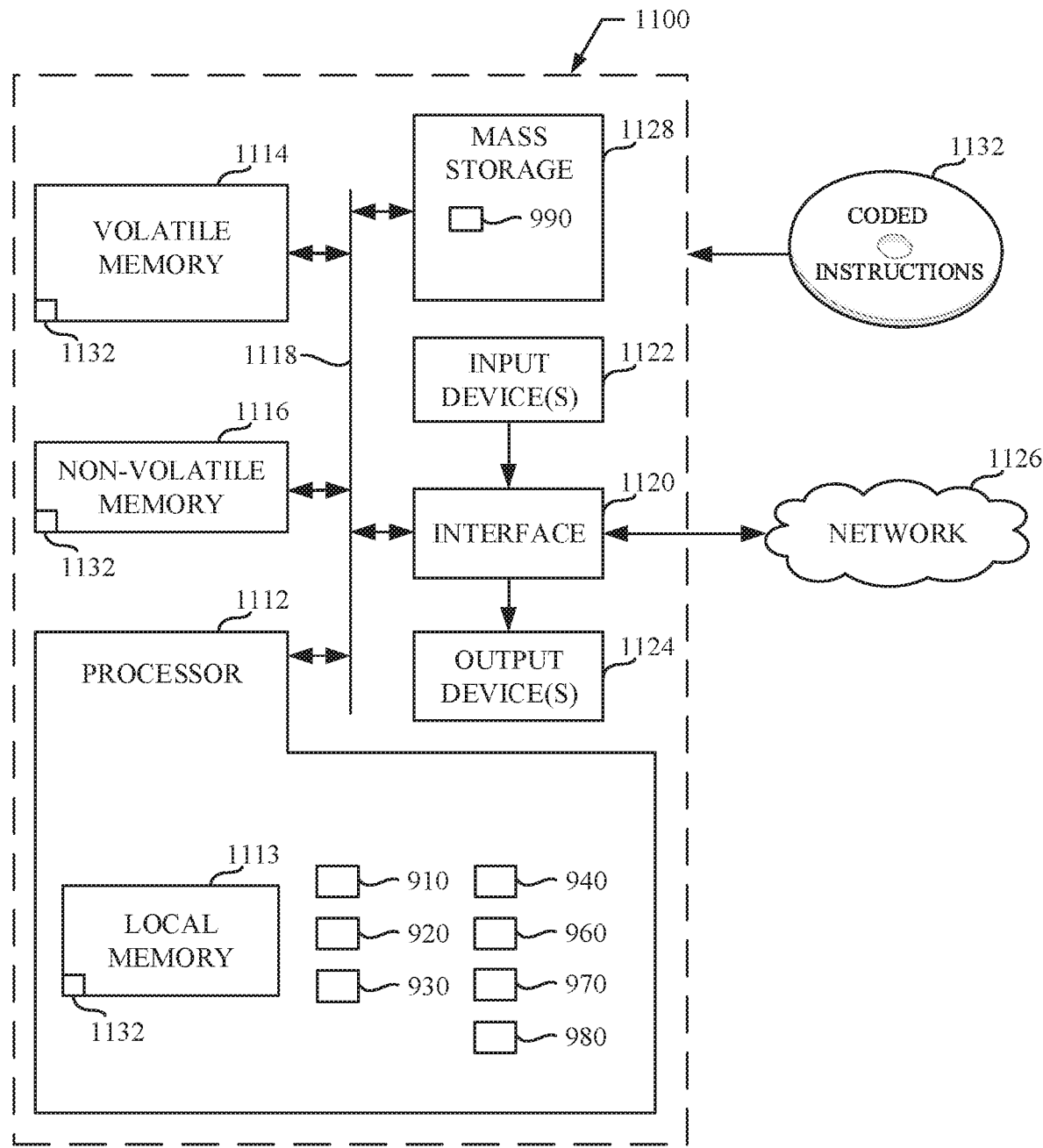
FIG. 11 is a block diagram of an example processing platform structured to execute the instructions of FIG. 3 to implement the example object scanner of FIG. 9.

FIG. 11 is a block diagram of an example processor platform 1100 structured to execute the instructions of FIG. 10 to implement the object scanner 120 of FIG. 9. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the scanning systems 910, 920, the time delay controller 930, the capture synchronizer 940, the capture combiner 960, the object detector 970, and the detection indicator 980.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIG. 9 may be stored in the mass storage device 1128, in the volatile memory 1114, in the non-volatile memory 1116, and/or on a removable non-transitory computer readable storage medium such as a CD or DVD.

Example methods, apparatus, systems, and articles of manufacture to combine frames of overlapping scanning systems are disclosed herein. Further examples and combinations thereof include the following:

Example 1 includes an apparatus to combine frames of overlapping scanning systems, the apparatus comprising a time delay controller to determine a first time value and a second time value, the first time value different from the second time value, a capture synchronizer to, in response to the first time value corresponding to a first time, capture a first frame from a first scanning system and, in response to the second time value corresponding to a second time, capture a second frame from a second scanning system, and a capture combiner to combine the first frame and the second frame into a third frame, the third frame including data from the first frame and data from the second frame.

Example 2 includes the apparatus of example 1, wherein the time delay controller is to determine the first time value and the second time value using a time for the first scanning system to generate a data point during the capture of the first frame.

Example 3 includes the apparatus of example 2, wherein a difference between the first time value and the second time value is half of the time for the first scanning system to generate the data point.

Example 4 includes the apparatus of example 1, wherein the time delay controller is to determine the first time value and the second time value using a time for the first scanning system to generate a frame.

Example 5 includes the apparatus of example 4, wherein a difference between the first time value and the second time value corresponds to half of the time for the first scanning system to generate the frame.

Example 6 includes the apparatus of example 1, wherein the time delay controller is to determine the first time value and the second time value using a velocity measurement of the apparatus, wherein the first time value and the second time value are scaled proportionally to the velocity measurement.

Example 7 includes the apparatus of example 1, wherein the capture synchronizer includes a clock, the clock shared between the first scanning system and the second scanning system.

Example 8 includes the apparatus of example 7, wherein, the first scanning system and the second scanning system further include an internal synchronization controller to determine a time to capture a frame.

Example 9 includes the apparatus of example 1, wherein the first scanning system is operated as a master and the second scanning system is operated as a slave.

Example 10 includes the apparatus of example 1, wherein the first scanning system is a LIDAR system in an autonomous vehicle.

Example 11 includes the apparatus of example 1, wherein the first scanning system corresponds to a first scanning area, the second scanning system corresponds to a second scanning area, and the third frame corresponds to a third scanning area, the third scanning area corresponding to a combination of the first scanning area and the second scanning area.

Example 12 includes at least one non-transitory computer readable medium comprising instructions that, when executed, cause at least one processor to at least determine a first time value and a second time value, the first time value different from the second time value, in response to the first time value corresponding to a first time, capture a first frame from a first scanning system, in response to the second time value corresponding to a second time, capture a second frame from a second scanning system, and combine the first frame and the second frame into a third frame, the third frame including data from the first frame and data from the second frame.

Example 13 includes the at least one non-transitory computer readable medium of example 12, wherein the instructions, when executed, cause the at least one processor to determine the first time value and the second time value a time for the first scanning system to generate a data point during the capture of the first frame.

Example 14 includes the at least one non-transitory computer readable medium of example 12, wherein the instructions, when executed, cause the at least one processor to determine the first time value and the second time value a time for the first scanning system to generate a frame.

Example 15 includes the at least one non-transitory computer readable medium of example 12, wherein the instructions, when executed, cause the at least one processor to determine the first time value and the second time value using a velocity measurement of the first scanning system, wherein the first time value and the second time value scaled proportionally to the velocity measurement.

Example 16 includes the at least one non-transitory computer readable medium of example 12, wherein the instructions, when executed, cause the at least one processor to generate a shared clock, the shared clock connecting the first scanning system and the second scanning system.

Example 17 includes a method of combining frames of overlapping scanning systems, the method comprising determining, by executing an instruction with a processor, a first time value and a second time value, the first time value different from the second time value, in response to the first time value corresponding to a first time, capturing, by executing an instruction with the processor, a first frame from a first scanning system, in response to the second time value corresponding to a second time, capturing, by executing an instruction with the processor, a second frame from a second scanning system, and combining, by executing an instruction with the processor, the first frame and the second frame into a third frame, the third frame including data from the first frame and data from the second frame.

Example 18 includes the method of example 17, wherein the determining the first time value and the second time value includes using a time for the first scanning system to generate a data point during the capturing of the first frame.

Example 19 includes the method of example 18, wherein a difference between the first time value and the second time value is half of the time for the first scanning system to generate the data point.

Example 20 includes the method of example 17, wherein the determining the first time value and the second time value includes using a time for the first scanning system to generate a frame.

Example 21 includes the method of example 20, wherein a difference between the first time value and the second time value is half of the time for the first scanning system to generate the frame.

Example 22 includes the method of example 17, wherein the determining the first time value and the second time value includes using a velocity measurement of the first scanning system, wherein the first time value and the second time value scaled proportionally to the velocity measurement.

Example 23 includes the method of example 17, wherein the determining the first time value and the second time includes generating a shared clock, the shared clock connecting the first scanning system and the second scanning system. From the foregoing, it will be appreciated that example methods, apparatus and articles of manufacture have been disclosed that combine frames of overlapping scanning systems. The disclosed methods, apparatus and articles of manufacture improve the efficiency of using a computing device by increasing the fidelity of a captured frame without the use of additional scanning systems. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to combine frames of overlapping scanning systems, the apparatus comprising:
    a time delay controller to determine a first time value and a second time value, the first time value different from the second time value;
    a capture synchronizer to, in response to the first time value corresponding to a first time, capture a first frame from a first scanning system and, in response to the second time value corresponding to a second time, capture a second frame from a second scanning system; and
    a capture combiner to combine the first frame and the second frame into a third frame, the third frame including data from the first frame and data from the second frame.

2. The apparatus of claim 1, wherein the time delay controller is to determine the first time value and the second time value using a time for the first scanning system to generate a data point during the capture of the first frame.

3. The apparatus of claim 2, wherein a difference between the first time value and the second time value is half of the time for the first scanning system to generate the data point.

4. The apparatus of claim 1, wherein the time delay controller is to determine the first time value and the second time value using a time for the first scanning system to generate a frame.

5. The apparatus of claim 4, wherein a difference between the first time value and the second time value corresponds to half of the time for the first scanning system to generate the frame.

6. The apparatus of claim 1, wherein the time delay controller is to determine the first time value and the second time value using a velocity measurement of the apparatus, wherein the first time value and the second time value are scaled proportionally to the velocity measurement.

7. The apparatus of claim 1, wherein the capture synchronizer includes a clock, the clock shared between the first scanning system and the second scanning system.

8. The apparatus of claim 7, wherein, the first scanning system and the second scanning system further include an internal synchronization controller to determine a time to capture a frame.

9. The apparatus of claim 1, wherein the first scanning system is operated as a master and the second scanning system is operated as a slave.

10. The apparatus of claim 1, wherein the first scanning system is a LIDAR system in an autonomous vehicle.

11. The apparatus of claim 1, wherein the first scanning system corresponds to a first scanning area, the second scanning system corresponds to a second scanning area, and the third frame corresponds to a third scanning area, the third scanning area corresponding to a combination of the first scanning area and the second scanning area.

12. At least one non-transitory computer readable medium comprising instructions that, when executed, cause at least one processor to at least:
    determine a first time value and a second time value, the first time value different from the second time value;

in response to the first time value corresponding to a first time, capture a first frame from a first scanning system;

in response to the second time value corresponding to a second time, capture a second frame from a second scanning system; and combine the first frame and the second frame into a third frame, the third frame including data from the first frame and data from the second frame.

13. The at least one non-transitory computer readable medium of claim 12, wherein the instructions, when executed, cause the at least one processor to determine the first time value and the second time value a time for the first scanning system to generate a data point during the capture of the first frame.

14. The at least one non-transitory computer readable medium of claim 12, wherein the instructions, when executed, cause the at least one processor to determine the first time value and the second time value a time for the first scanning system to generate a frame.

15. The at least one non-transitory computer readable medium of claim 12, wherein the instructions, when executed, cause the at least one processor to determine the first time value and the second time value using a velocity measurement of the first scanning system, wherein the first time value and the second time value scaled proportionally to the velocity measurement.

16. The at least one non-transitory computer readable medium of claim 12, wherein the instructions, when executed, cause the at least one processor to generate a shared clock, the shared clock connecting the first scanning system and the second scanning system.

17. A method of combining frames of overlapping scanning systems, the method comprising:

determining, by executing an instruction with a processor, a first time value and a second time value, the first time value different from the second time value;

in response to the first time value corresponding to a first time, capturing, by executing an instruction with the processor, a first frame from a first scanning system;

in response to the second time value corresponding to a second time, capturing, by executing an instruction with the processor, a second frame from a second scanning system; and combining, by executing an instruction with the processor, the first frame and the second frame into a third frame, the third frame including data from the first frame and data from the second frame.

18. The method of claim 17, wherein the determining the first time value and the second time value includes using a time for the first scanning system to generate a data point during the capturing of the first frame.

19. The method of claim 18, wherein a difference between the first time value and the second time value is half of the time for the first scanning system to generate the data point.

20. The method of claim 17, wherein the determining the first time value and the second time value includes using a time for the first scanning system to generate a frame.

21. The method of claim 20, wherein a difference between the first time value and the second time value is half of the time for the first scanning system to generate the frame.

22. The method of claim 17, wherein the determining the first time value and the second time value includes using a velocity measurement of the first scanning system, wherein the first time value and the second time value scaled proportionally to the velocity measurement.

23. The method of claim 17, wherein the determining the first time value and the second time includes generating a shared clock, the shared clock connecting the first scanning system and the second scanning system.

\* \* \* \* \*